UNITED STATES PATENT OFFICE.

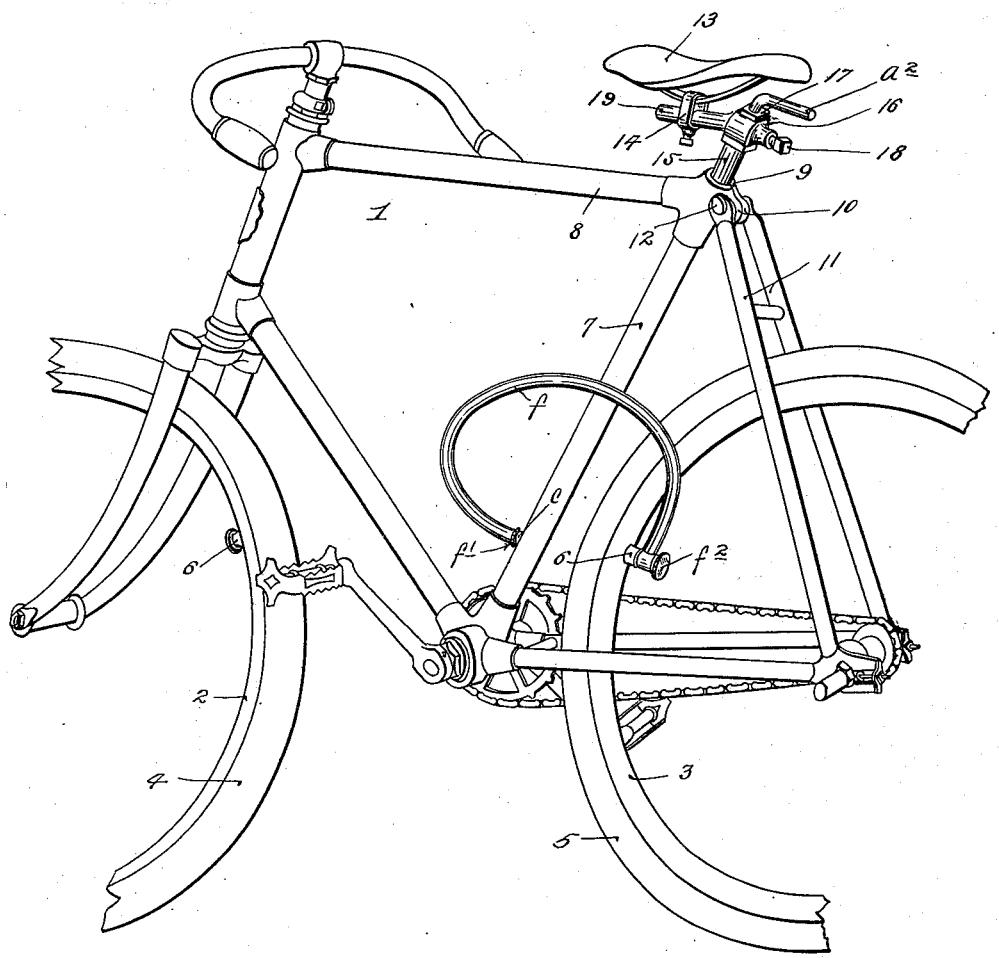

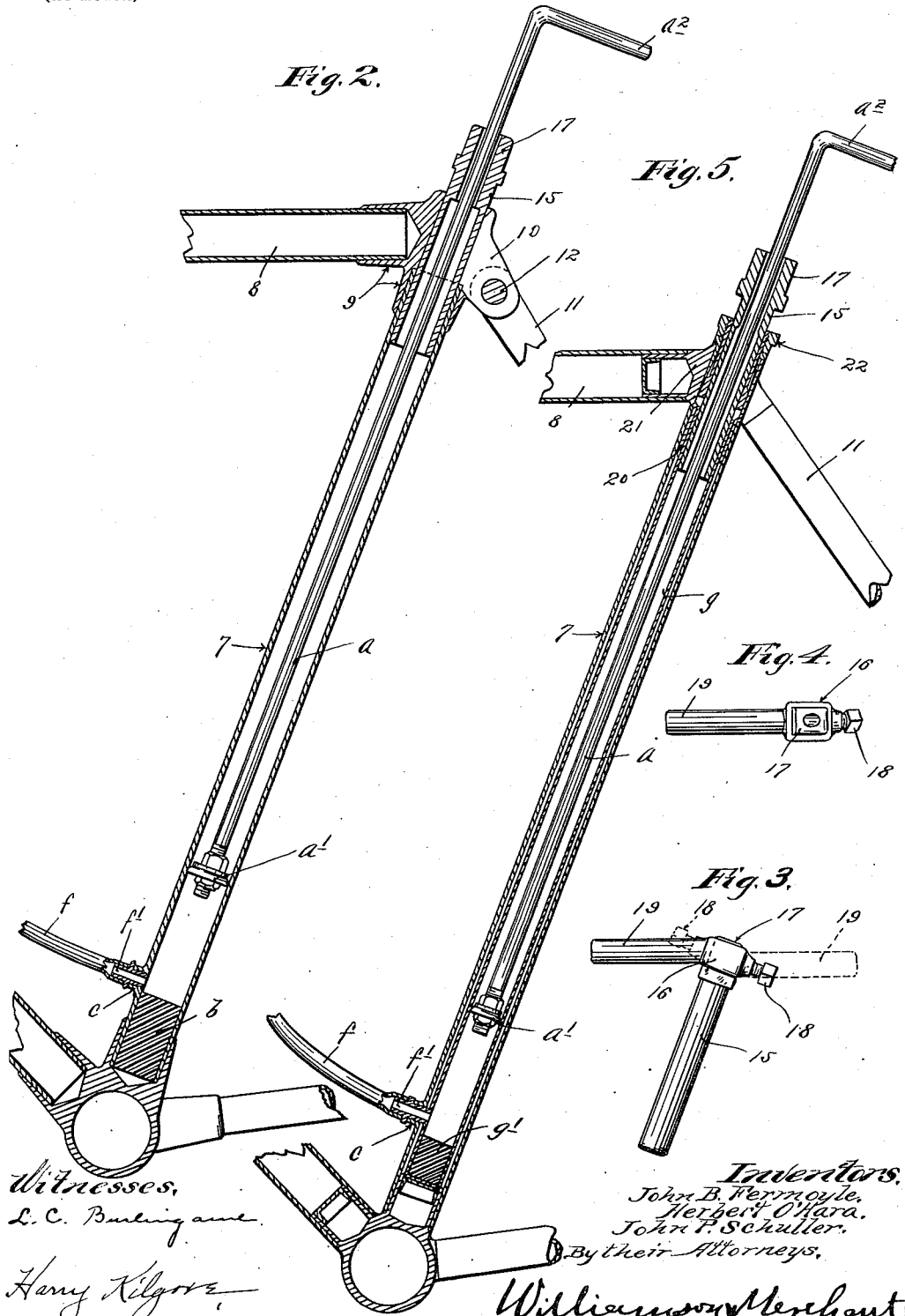

JOHN B. FERMOYLE, HERBERT O'HARA, AND JOHN P. SCHULLER, OF MINNEAPOLIS, MINNESOTA.

BICYCLE-FRAME PUMP.

SPECIFICATION forming part of Letters Patent No. 664,936, dated January 1, 1901.

Application filed January 22, 1900. Serial No. 2,259. (No model.)

*To all whom it may concern:*

Be it known that we, JOHN B. FERMOYLE, HERBERT O'HARA, and JOHN P. SCHULLER, citizens of the United States, residing at Minneapolis, in the county of Hennepin and State of Minnesota, have invented certain new and useful Improvements in Bicycle-Frame Pumps; and we do hereby declare the following to be a full, clear, and exact description of the invention, such as will enable others skilled in the art to which it appertains to make and use the same.

Our invention has for its especial object to provide an attachment or device for use in connection with one of the frame-tubes of a bicycle or other cycle whereby a pump is afforded; and to this end our invention consists of the novel devices and combinations of devices hereinafter described, and defined in the claims.

The invention is illustrated in the accompanying drawings, wherein like characters indicate like parts throughout the several views.

Figure 1 is a perspective view with some parts broken away, showing an ordinary bicycle with our invention applied thereto. Fig. 2 is a vertical longitudinal section taken centrally through the upright tube of the bicycle-frame and showing a piston which in accordance with our invention is applied to the said upright tube, the other tubes of the frame being broken away. Fig. 3 is a side elevation showing the seat-post in detail, the removable head thereof being shown as reversed by dotted lines. Fig. 4 is a plan view of the seat-post; and Fig. 5 is a view corresponding to Fig. 2, but illustrating a modified construction.

Of the parts of the bicycle the numeral 1 indicates the main frame as an entirety, and the numerals 2 and 3 indicate the wheels of the same provided, respectively, with pneumatic tires 4 and 5, which have the ordinary charging-nipples 6.

The numeral 7 indicates the upright tube of the frame, which is united at its upper end to the horizontal upper tube 8 in the ordinary manner by a tubular head 9, which receives the said tube and is provided with rearwardly-projecting lugs or ears 10, the said head 9 being split between said lugs. The backstay-tubes 11 are at their upper ends drawn together and onto the ears 10 by means of a nutted bolt 12, which when tightened also serves to draw the head 9 onto the seat-post.

The numeral 13 indicates the bicycle-seat, which is secured by a clamp 14 to the head of the seat-post.

The construction so far described is one of the standard constructions.

The numeral 15 indicates the stem, and the numeral 16 the head, of the seat-post, the latter of which is detachably secured to the squared upper end 17 of said stem by means of a set-screw 18. The head 16 is provided with a projecting rod 19, which extends at such an angle thereto that it will project approximately in a horizontal plane whether it be turned forward, as indicated by full lines, or backward, as indicated by dotted lines, in Fig. 3.

In accordance with the preferred form of our invention the upright tube 7 is utilized as the barrel or cylinder of an air-pump, and the stem or rod $a$ of the piston $a'$ works loosely and with clearance through the upper end of the seat-post 15, while the piston $a$ fits and works in the said tube 7. The piston $a$ is of that type of flexible piston which while it forms a close joint with the barrel under the operative stroke freely yields to permit the entrance of air into the tube or cylinder below the piston under return or outward strokes thereof. In the construction illustrated a rubber plug $b$ is shown as tightly pressed in the lower end of the tube 7 to tightly close the said tube and incidentally to serve as a cushion when engaged by the inner end of the piston-rod $a$. Immediately above the plug $b$ the tube 7 is provided with a discharge nipple or opening $c$, which may be either integrally formed therewith or brazed or otherwise applied to the tube at any time.

$f$ indicates the air-delivery tube of the pump, which is preferably in the form of a small rubber hose of sufficient length to reach from the nipple or perforation $c$ of the pump tube or barrel to either of the charging-nipples 6 of the bicycle-tires. At its receiving end the tube $f$ is provided with a metallic tubular extension or coupling $f'$, which has screw-threaded engagement with the nipple c, thus adapting the hose f to be detached from the tube 7. At its discharge end the hose f is provided with an ordinary coupling $f^2$, which is adapted to make the proper connection with the charging-nipples 6 of the pneumatic tires.

The seat-post 15 of course closely fits its seat in the head 9 and in the upper end of the tube 7, and it is, as already indicated, secured in its set position by means of the nutted bolt 12. The clearance between the upper end of the seat-post 15 and the piston-rod a permits the admission of air into the tube 7; but this of course might be provided for otherwise—as, for instance, by perforations in the upper end portion of the said tubes 7.

The upper and outer end of the piston-rod a is preferably turned in one direction only to form a handle $a^2$, which permits of the ready removal of the seat-post head 16, with the seat rigidly secured to the horizontal projection 19 thereof. Hence simply by loosening the set-screw 18 the said seat-post head may be removed with the seat 13, so as to permit of the free action of the piston-rod, and the seat-post head may be again applied very quickly. Hence the removal of the seat is not objectionable, as would be the case if the seat were thrown out of adjustment by such a manipulation. In some cases the seat is located so far forward that its removal would not be necessary.

The action of the pump is obvious, and it will be understood that a pump applied as above described will be of large capacity and will have great power. Furthermore, the pump is of course always at hand when needed, and when it is not needed it will be entirely out of the way and the rider is relieved of the necessity of carrying a pump on his person or in a tool-bag. Furthermore, it will be impracticable to carry a pump of the size thus afforded either in the tool-bag or about the person. The small hose f may be removed and placed in the tool-box or in the pocket, or it may be secured, without having been detached, to one of the frame-tubes.

When the pump is in operation, it is of course supported by the machine, and the operator is not compelled to hold the pump either by means of his hand or by his feet, as is ordinarily the case in operating a pump, it being only necessary to stand or hold the machine in some suitable position.

In the modification illustrated in Fig. 3 the pump is applied to another standard form of bicycle-frame, in which the upright frame-tube 7 is placed around instead of within a tubular extension 20 of a head 21, which corresponds to the head 9 heretofore noted, but varies in construction. In this construction an expansible tubular seat-post clamp 22 works in the head 21 in the ordinary manner to clamp the seat-post 15.

With the construction illustrated in Fig. 5 it is not feasible to employ the tube 7 itself as the cylinder of the pump for the reason that it would be difficult to insert therein after the frame is formed a piston of suitable construction. Hence an interior or lining tube g is employed as the cylinder proper of the pump. This cylinder g is of such diameter that it may when the expander 22 is removed be passed into the tube 7 and through the interior tubular extension 20 of the head 21. At its lower or inner end this cylinder g is closed, and it is preferably provided with a rubber bumper or stop $g'$, against which the lower end of the piston-rod a may strike to limit the downward movement of the piston $a'$. With this construction the threaded tubular extension $f'$ of the hose f is screwed on through the nipple c of the tube 7 and through the adjacent wall of the lower end of the cylinder g. This connection between the hose f and the cylinder g may, however, be made in many other ways.

The construction illustrated in Fig. 5 while clearly within the broad scope of our invention is not by any means the full equivalent of the construction illustrated in Fig. 2, wherein the frame is of itself made to serve as the cylinder of the pump.

Other alterations than those set forth may of course be made within the scope of our invention.

What we claim, and desire to secure by Letters Patent of the United States, is as follows:

1. In a bicycle, the combination with the upright tube thereof, of a seat-post provided with a removable head to which the seat is directly secured, of a piston working within said tube and provided with a stem that works outward through said seat-post and said removable head, said stem being so constructed and related to said head that said head, together with the attached seat may be removed from the end of said stem without changing the adjustment of said seat, substantially as described.

2. In a bicycle, the combination, with the upright tube 7, the seat-post 15 with angular portion 17, the head 16 detachably securable to the said angular portion 17 and provided with a projection to which the seat is attached, of the piston $a'$ working within said tube 7 for coöperation therewith as a pump, and provided with the stem or rod a working outwardly through said seat-post 15, and terminated in a laterally-bent handpiece $a^2$ which permits of the ready removal of said head 16, and a flexible connection for delivering the air from the pump to the pneumatic tires of the machine, substantially as described.

In testimony whereof we affix our signatures in presence of two witnesses.

JOHN B. FERMOYLE.
HERBERT O'HARA.
JOHN P. SCHULLER.

Witnesses:
F. D. MERCHANT,
L. C. BURLINGAME.